United States Patent [19]

Cain et al.

[11] Patent Number: 5,476,676
[45] Date of Patent: * Dec. 19, 1995

[54] CHOCOLATE COMPOSITIONS BASED ON HARDSTOCK FAT ADDITIVES

[75] Inventors: Frederick W. Cain, Voorburg; Willem Dekker, Hoorn; Adrian D. Hughes, Den Haag, all of Netherlands

[73] Assignee: Loders Croklaan B.V., Wormerveer, Netherlands

[ * ] Notice: The portion of the term of this patent subsequent to Jun. 28, 2011, has been disclaimed.

[21] Appl. No.: 29,863

[22] Filed: Mar. 11, 1993

[30] Foreign Application Priority Data

Mar. 11, 1992 [EP] European Pat. Off. .............. 92200677

[51] Int. Cl.⁶ ........................................................ A23D 9/00
[52] U.S. Cl. ........................................... 426/607; 426/660
[58] Field of Search ..................... 426/606, 660, 426/804, 607

[56] References Cited

U.S. PATENT DOCUMENTS

| | | |
|---|---|---|
| 2,975,063 | 3/1961 | Paul et al. . |
| 2,979,407 | 4/1961 | Duck . |
| 3,012,890 | 12/1961 | Dutton et al. . |
| 3,491,677 | 1/1970 | Bracco . |
| 4,157,405 | 6/1979 | Yasuda et al. . |
| 4,199,611 | 4/1980 | Toyoshima et al. . |
| 4,208,445 | 6/1980 | Cottier et al. . |
| 4,219,584 | 8/1980 | Mori et al. . |
| 4,234,618 | 11/1980 | Jasko et al. . |
| 4,268,534 | 5/1981 | Kawada et al. . |
| 4,276,322 | 6/1981 | Padley et al. . |
| 4,283,436 | 8/1981 | Soeters et al. . |
| 4,348,423 | 9/1982 | Pairaud et al. . |
| 4,366,181 | 12/1982 | Dykshoorn ............................ 426/607 |
| 4,410,557 | 10/1983 | Miller ...................................... 426/607 |
| 4,486,457 | 12/1984 | Schijf ...................................... 426/607 |
| 4,533,561 | 8/1985 | Ward . |
| 4,594,259 | 6/1986 | Baker et al. . |
| 4,613,514 | 9/1986 | Maruzeni et al. . |
| 4,705,692 | 11/1987 | Tanaka et al. . |
| 4,839,192 | 6/1989 | Sagi et al. . |
| 4,861,611 | 8/1989 | Baba et al. . |
| 4,873,109 | 10/1989 | Tanaka et al. . |
| 4,882,192 | 11/1989 | Maeda et al. . |
| 4,888,196 | 12/1989 | Ehrman et al. . |
| 4,902,527 | 2/1990 | Galenkamp et al. . |
| 4,910,037 | 3/1990 | Sagi et al. . |
| 5,023,106 | 6/1991 | Ehrman et al. . |
| 5,066,510 | 11/1991 | Ehrman et al. . |
| 5,135,769 | 8/1992 | Itagaki et al. . |
| 5,324,533 | 6/1994 | Cain ....................................... 426/607 |

FOREIGN PATENT DOCUMENTS

| | | |
|---|---|---|
| 530864 | 3/1983 | European Pat. Off. . |
| 196210 | 10/1986 | European Pat. Off. . |
| 285422 | 10/1988 | European Pat. Off. . |
| 354025 | 2/1990 | European Pat. Off. . |
| 521549 | 1/1993 | European Pat. Off. . |
| 1431781 | 4/1976 | United Kingdom . |
| 2168071 | 6/1986 | United Kingdom . |

OTHER PUBLICATIONS

Derwent Abstract of SU 665,885.
Derwent Abstract of JP 46026824.

*Primary Examiner*—Carolyn Paden
*Attorney, Agent, or Firm*—Cushman Darby & Cushman

[57] ABSTRACT

Mid-fractions of triglycerides, containing ($H_2M+HM_2$)-type triglycerides (H= saturated fatty acid $\geq C_{16}$; M=saturated fatty acids $C_8-C_{14}$), which meet the following requirements:

$$\frac{C_{12}}{C_{18:0}} = 0.1-1.2$$

content $C_{52}-C_{54}$-triglycerides<7.0%
content $C_{36}-C_{40}$-triglycerides<25%
chain length of fatty acids residues $C_8-C_{18}$
display excellent anti-blooming properties, when applied in chocolate compositions.

14 Claims, No Drawings

CHOCOLATE COMPOSITIONS BASED ON HARDSTOCK FAT ADDITIVES

BACKGROUND OF THE INVENTION

Chocolate compositions containing such conventional ingredients as cocoa powder, cocoa butter, cocoa butter equivalents, sugar and emulsifier need to be tempered because of the presence of polymorphic fats such a POP, POSt and/or StOSt (P=palmitic acid, St=stearic acid and O=oleic acid). Still, it was very difficult to avoid bloom formation, i.e. a polymorphic transformation of the crystal lattice. Therefore, many attempts have been made to find additives that could prevent bloom formation in chocolate compositions. Examples of such conventional additives are butterfat, fully hardened high-erucic rapeseed and BOB (B=behenic, O=oleic). Also emulsifiers have been used for this purpose.

However, very often the results obtainable with these conventional additives are not satisfactory. Therefore, we conducted a study in order to find out whether it was possible to find new, more effective additives, based on triglycerides.

As a result of this study we found that the use of a particular hardstock fat in the chocolate composition led to better results. Chocolate compositions consisting of at least the conventional chocolate ingredients and at least 25 wt. % of a fat, including optionally hardstock components, and which compositions are characterized by the presence of an amount of ($H_2M+HM_2$) fat of at least 0.5 wt. %, while the SOS content of the composition is at least 15 wt. %, in which:

H means saturated fatty acid with $\geq C_{16}$;
M means saturated fatty acid with $C_8$–$C_{14}$;, preferably $C_{12}$–$C_{14}$;
S means saturated fatty acid with $C_{16}/C_{18}$;
O means oleic acid, which resulted from this study, are the subject of out European patent application 91 306026.5.

The above-mentioned requirement of at least 0.5% ($H_2M+HM_2$) in the composition can be fulfilled by the addition of the lauric fat (=$HM_2+H_2M$ fat) to the chocolate composition. The chocolate composition can then be used for the preparation of such chocolate products as chocolate bars. For this purpose, the chocolate is tempered before it is moulded into bars or used to make the shells of filled products.

Although products having an increased resistance to blooming were obtained in this way, these still displayed a disadvantageous effect, i.e. the viscosity of the chocolate at temper was slightly too high for some applications.

Therefore, we have conducted a study to see whether a fat could be found combining the advantageous resistance to blooming of our ($H_2M+HM_2$) fats with a lower viscosity of the chocolate at temper.

We found that a specific now fat fraction of the ($H_2M+HM_2$) fat fulfilled these requirements.

SUMMARY OF THE INVENTION

Therefore, our invention concerns in the first place novel fat compositions which are vegetable fat compositions comprising ($H_2M+HM_2$) fats, wherein H and M have the same meaning as given above, in which fats the weight ratio of the $C_{12}$ fatty acid content to the $C_{18:0}$ fatty acid content, i.e. $C_{12}$–$C_{18:0}$ is within the range of 0.1–1.2, preferably 0.4–1.0; at the same time the fat has a content of triglycerides with total ($C_{52}+C_{51}$) of less that 7.0 wt. %, preferably less than 5 wt. % and a total content of ($C_{36}$–$C_{40}$) triglycerides of less than 25 wt. %, preferably less than 20 wt. %. The chain length of the fatty acid residues in our novel fat composition is $C_8$–$C_{18}$, in particular $C_{12}$–$C_{18}$.

The best results are obtained when so much of this novel fat is used in our chocolate composition that the ($H_2M+HM_2$) content thereof is 0.5–15 wt. %, preferably 0.8–2.0 wt. %. Therefore, 0.5–15 wt. % of the novel fat composition should be incorporated into the chocolate.

DETAILED DESCRIPTION OF THE INVENTION

As hard fat component containing the ($H_2M+HM_2$)- fat components, mid-fractions of interesterified mixtures of vegetable oils high in triglycerides with fatty acid residues with at least 16 C atoms and triglycerides rich in lauric and/or myristic acid residues can be used advantageously. Examples or such fat mixtures that still have to fractionated, are mentioned in, e.g., our Australian patent application 12346/83, Ser. No. 549,465.

In particular, interesterified mixtures of palm oil and palmkernel oil, such as an interesterified mixture of PO-58 and PK-39 or of hardened palm oil-58 and hardened palm kernel olein with melting point 42° C. (ratio: 70:30), are very suitable starting materials for the fractionation. In particular, the olein fraction of the wet fractionation of the stearin fraction of such an interesterified fat mixture that fulfils the requirements mentioned above, gives very satisfactory results.

Our invention further concerns blends of a fat A, containing at least 40 wt. %, preferably at least 50 wt. % of a triglyceride SIS (S=$C_{16:0}$ or $C_{18:0}$; O=$C_{18:1}$) and a fat B, containing the ($H_2M+MH_2$) mid fraction defined above with the prequisitie that the SOS content of the blend is at least 35 wt. %. Examples of fats A, containing at least 40 wt. % SOS are cocoa butter and cocoa butter equivalents, such as palm oil midfractions, shae stearin or Illipe or mixtures hereof.

It is preferred that the content of trisaturated triglycerides of the cocoa butter equivalents is less than 8 wt. %, preferably less than 5 wt. %, in particular less than 3 wt. %. It should be understood that those trisaturated triglycerides are derived from $C_{16:0}$ and/or $C_{18:0}$ fatty acids.

The hardstock can be used in any kind of chocolate composition. So, plain chocolate and milk chocolate can both be used. The chocolate can also contain other ingredients, such as flavour, fruit components etc.

The invention also concerns a process for the production of the chocolate composition. The products are made in a conventional way, whereby the fraction containing the ($H_2M+HM_2$) hardstock is incorporated into the composition, whereupon the compositions thus obtained are tempered and the tempered compositions are used for the preparation of such confectionery products as chocolate bars. However, the fats can also be incorporated into the shells of encapsulated filled products, e.g. as illustrated in Example 2.

Furthermore, our invention is concerned with the use of the novel fat compositions in order to achieve retardation of blood of chocolate compositions and to lower the viscosity of chocolate at temper.

The invention will now be illustrated by the following non-limiting examples.

EXAMPLE 1

2% (on product of each of the fats mentioned below, was added to standard dark Callebaut chocolate. The chocolate was batch-tempered at 30° C. n the Leatherhead temper kettle. Bars were moulded at temper (as defined by the Greer test) and put in storage at 20°/32° C. In addition, the viscosity of the tempered chocolate was measured at 30° C. in a Haake viscometer. The shear rate was varied from 0 to 22.5 reciprocal seconds over 2 minutes.

|  | $(MH_2 + M_2H)$ | Mid-fraction $(MH_2 + M_2H)$ | Hardened palmkernel-41 |
|---|---|---|---|
| Bloom (months) | >3 | >3 | <1 (3 weeks) |
| $\frac{C_{12}}{C_{18:0}}$ | 0.45 | 0.54 | 2.1* |
| $C_{52} + C_{54}$ | 14* | 3 | 5.9 |
| $C_{36} - C_{40}$ | 11 | 15.3 | 46.3* |
| Viscosity @ 30° C. (Pa.s) of tempered chocolate | 4 | 1.5 | 2.8 |
| Yield value @ 30° C. (Pa) of tempered chocolate | 13 | 10.1 | 11.1 |

*not according to the invention

EXAMPLE 2

In each case, 2% (on product) of each of the fats mentioned below was added to a 31% fat, dark chocolate containing 3% (on product) of a cocoabutter equivalent (mixture of a palm mid-fraction, shae stearin and Illip) The chocolate was slab-tempered and shells were made.

The shells were filled with a standard peanut paste (formulation given below). Samples were then backed off and put in storage at 25° C.

The chocolates were slab-tempered. During the tempering and moulding, the $(M_2H+MH_2)$ fat-containing system was difficult to work with. The viscosities of these systems were measured as follows:

The chocolate was cooled from 50° C. to 30° C. Once the chocolate temperature reached 30° C., 0.1% refiner's paste was added and the time adjusted to zero. After 35 minutes, a sample was taken and the viscosity at 30° C. determined, using a shear rate which as varied from 0 to 22.5 reciprocal seconds over 2 minutes. The Casson values[1] quoted are calculated, using the standard equation.

[1] cf: Casson-Viskosität Analytische methoden 10-D (1973). Max Glättli, CH-b 6934Bioggio, Schweiz.

|  | $(MH_2 + M_2H)$ 2% | Mid-fraction $(MH_2 + M_2H)$ 2% | cocoa butter equivalent 2% |
|---|---|---|---|
| Bloom of shells (months) at 25° C. | >1 | >1 | <1 (2 weeks) |
| $\frac{C_{12}}{C_{18:0}}$ | 0.45 | 0.7 | 0.003** |
| $C_{52} + C_{54}$ | 10.3** | 3.7 | 56** |
| $C_{36} - C_{40}$ | 10.6 | 13.4 | <1 |
| Viscosity @ 30° C. (Pa.s) (after 35 min.) | 6.7 | 2.8 | 2.3 |
| Yield value @ 30° C. (Pa) (after 35 min.) | 25.0 | 12.2 | 12.7 |

*not according to the invention.

Formulation of filling

| Icing sugar | 22.5% |
| Salt | 0.5% |
| Skimmed milk powder | 3.3% |
| Peanut paste | 64.6% |
| SHs | 9.1% |
| Fat content of filling | 44.7% |

Peanut paste prepared as follows:

1. Roast peanuts for 20–25 min. at 200° C.;
2. Cool and crush, using a Stephan universal mixer for 2.5 min. at 1500 rpm., and 5 min. at 3000 rpm.

Formulation of chocolate used:

| Cocoa powder 10/12 | 19.2% |
| Sugar | 51.3% |
| Cocoa butter | 26.4% |
| Cocoabutter equiv. | 3.1% |

We claim:

1. Blends of triglycerides comprising a fat (A) containing at least 40 wt. % of SOS (S=$C_{16:0}$ or $C_{18:0}$; O=$C_{18:1}$) and a fat (B) containing an ($H_2M+M_2H$) fat, characterized in that the blend contains so much of fat (A) that the SOS content of the blend is at least 35 wt. %, while fat (B) is a triglyceride composition comprising vegetable fats containing ($H_2M+HM_2$)-type triglycerides, wherein H means saturated fatty acid with $C_{16}$–$C_{18}$;

M means saturated fatty acid with $C_8$–$C_{14}$;, preferably $C_{12}$–$C_{14}$, characterized in that the weight ratio of the $C_{12}$ fatty acid content to the $C_{18:0}$ fatty acid content, i.e., $C_{12}/C_{18:0}$ is 0.1–1.2;

the content of triglycerides having 52–54 C-atoms (i.e., $C_{52}+C_{54}$) is less than 7.0 wt. %;

the content of triglycerides having 36–40 C-atoms (i.e., $C_{36}+C_{38}+C_{40}$) is less than 25 wt. %;

the chain length of the fatty acid residues of the triglycerides is $C_8$–$C_{18}$;

wherein the blends are suitable for the preparation of bloom resistant chocolate.

2. Blends of triglycerides according to claim 1, wherein fat A is selected from cocoa butter or cocoa butter equivalents, such as palm oil midfractions, shae stearin, Illipe or mixtures thereof.

3. Blends of triglycerides according to claim 2, wherein the cocoa butter equivalent has less than 8.0 wt. % of trisaturated triglycerides selected from the group consisting of triglycerides derived from $C_{16:0}$, triglycerides derived from $C_{18:0}$, and mixtures thereof.

4. Chocolate compositions consisting of at least the conventional chocolate ingredients and at least 25 wt. % of a fat, which compositions are characterized by the presence of the blend according to claim 1 containing ($H_2M+HM_2$) fat which ($H_2M+HM_2$) fat is present in the chocolate composition in an amount of 0.5–15 wt. % while the SOS content of the composition is at least 15 wt. %.

5. Chocolate compositions according to claim 4, wherein the content of the ($H_2M+HM_2$) fat is 0.8–2.0 wt. %.

6. Chocolate compositions according to claim 4, wherein the chocolate composition is made of plain chocolate or milk chocolate.

7. Chocolate compositions having the composition as mentioned in claim 4, wherein the compositions are tempered.

8. Chocolate bars comprising at least partly the tempered compositions of claim 7.

9. Chocolate shells of filled products comprising at least partly the tempered compositions of claim 7.

10. The composition according to claim 1, wherein the weight ratio of the $C_{12}$ fatty acid content to the $C_{18:0}$ fatty acid content, i.e., $C_{12}/C_{18:0}$ is 0.4–1.0.

11. The composition according to claim 1, wherein the content of triglycerides having 52–54 C-atoms (i.e., $C_{52}+C_{54}$) is less than 5.0 wt. %.

12. The composition according to claim 1, wherein the content of triglycerides having 36–40 C-atoms (i.e., $C_{36}+C_{38}+C_{40}$) is less than 20 wt. %.

13. The composition according to claim 1, wherein the chain length of the fatty acid residues of the triglycerides is $C_{12}-C_{18}$.

14. Method of retarding bloom of the chocolate composition and improving the viscosity of the chocolate composition at temper, the method comprising incorporating into the chocolate compositions a mid-fraction of a fat of the $(H_2M+HM_2)$-type triglycerides wherein H means saturated fatty acid with $C_{16}-C_{18}$.

M means saturated fatty acid with $C_8-C_{14}$; , preferably $C_{12}-C_{14}$, characterized in that the weight ratio of the $C_{12}$ fatty acid content to the $C_{18:0}$ fatty acid content, i.e., $C_{12}/C_{18:0}$ is 0.1–1.2;

the content of triglycerides having 52–54 C-atoms (i.e., $C_{52}+C_{54}$) is less than 7.0 wt. %;

the content of triglycerides having 36–40 C-atoms (i.e., $C_{36}+C_{38}+C_{40}$) is less than 25 wt. %;

the chain length of the fatty acid residues of the triglycerides is $C_8-C_{18}$.

* * * * *